US012038167B2

(12) United States Patent
Chen et al.

(10) Patent No.: US 12,038,167 B2
(45) Date of Patent: Jul. 16, 2024

(54) LAMP STRUCTURE OF UMBRELLA

(71) Applicant: XIAMEN MINGHE INDUSTRY CO., LTD., Fujian (CN)

(72) Inventors: Shun-Jung Chen, Hemei Township (TW); Sun-Feng Sung, Hemei Township (TW); Ming-Hsiung Chen, Hemei Township (TW)

(73) Assignee: XIAMEN MINGHE INDUSTRY CO., LTD., Fujian (CN)

( * ) Notice: Subject to any disclaimer, the term of this patent is extended or adjusted under 35 U.S.C. 154(b) by 0 days.

(21) Appl. No.: 18/453,845

(22) Filed: Aug. 22, 2023

(65) Prior Publication Data

US 2024/0077196 A1 Mar. 7, 2024

(30) Foreign Application Priority Data

Sep. 6, 2022 (TW) ................................. 111133773

(51) Int. Cl.

| | |
|---|---|
| ***A45B 25/06*** | (2006.01) |
| ***F21S 9/02*** | (2006.01) |
| ***F21V 23/04*** | (2006.01) |
| ***F21V 33/00*** | (2006.01) |

(52) U.S. Cl.

CPC .......... *F21V 33/0004* (2013.01); *A45B 25/06* (2013.01); *F21S 9/02* (2013.01); *F21V 23/04* (2013.01); *A45B 2200/1018* (2013.01)

(58) Field of Classification Search

CPC ..... F21V 33/0004; F21V 23/04; A45B 25/06; A45B 25/14; A45B 2200/1018; A45B 2200/1009; A45B 3/02; A45B 3/04; F21S 9/02

See application file for complete search history.

(56) References Cited

U.S. PATENT DOCUMENTS

| | | | | |
|---|---|---|---|---|
| 11,098,861 | B1 * | 8/2021 | Wang | A45B 23/00 |
| 2023/0033371 | A1 * | 2/2023 | Chen | F21V 23/04 |
| 2024/0032660 | A1 * | 2/2024 | Chen | A45B 25/02 |

* cited by examiner

*Primary Examiner* — Anabel Ton

(74) *Attorney, Agent, or Firm* — Demian K. Jackson; Jackson IPG PLLC

(57) ABSTRACT

A lamp structure of an umbrella contains a body, an illumination device, and a control pusher. The body includes a shaft, a notch, a runner slidably, and multiple stretchers. The illumination device includes at least one lighting element, a circuit board, and a battery. The circuit board has a control switch, when the runner is moved upward to push the illumination device, the umbrella is opened. The control pusher is connected to the runner and includes a controlling element. The control pusher is slid vertically with respect to the shaft and is switched in three-section positions, such that the control pusher is slid to a first position, a second position, and a third position relative to the shaft to drive the control switch to be conducted or not so that the circuit board controls the at least one lighting element to power on or off.

7 Claims, 14 Drawing Sheets

LAMP STRUCTURE OF UMBRELLA

TECHNICAL FIELD

The present invention relates to an umbrella, and more particularly to a lamp structure of an umbrella which has illumination and warning functions.

BACKGROUND

An umbrella is applied for a shelter from rain or sunlight. It does not have illumination and warning functions. If it is used in an environment with insufficient light, an additional flashlight is required for illumination and warning. Otherwise, when it's raining or the sky is dark, people or cars can easily hit a user with poor vision, and it's inconvenient to hold two objects at the same time when walking outside, it often binds the user's hands, affect user's ability to carry other objects or walking safety.

A conventional handle structure of an umbrella with illumination is disclosed in TW Utility Model No. M256705. The handle structure contains a body in which an accommodation chamber is defined; a lighting seat engaged in the accommodation chamber of the body to be pushed inward or pulled outward freely; a power device received in the lighting seat and being replaceable; and a lighting element and a switch electrically connected with the power device and engaged on the lighting seat. Thereby, the power device is switched to supply power to the lighting device, the lighting seat is pulled out of the accommodation chamber to be powered on, and the lighting element electrically connected with the power device will emit lights. When the illumination device is not used, the lighting seat is pushed back to the accommodation chamber, thus using the umbrella with the handle structure.

Referring to FIG. 14, a conventional lamp structure of an umbrella contains a light-emitting element 91 disposed on a handle 92, thus limiting illumination range. In addition, the light-emitting element 91 is disposed on the handle 92 at a low height, thus reducing warning reminder. The light-emitting element 91 disposed on the handle will influence aesthetics appearance and gripping comfort and cause connection inconvenience and difficulty.

Another conventional lamp structure of an umbrella is disclosed in TW Utility Model No. M623808, and the umbrella includes a body and an illumination device. The body of the umbrella contains a shaft, a notch disposed on an upper end of the shaft, a runner movably mating with the shaft, and multiple stretchers mounted on a handle of a lower end of the shaft and rotatably connected with the notch and the runner. The illumination device includes a light-emitting element, a main switch configured to power on/off the light-emitting element, and a battery configured to supply power to the light-emitting element. The light-emitting element matches with the shaft, and the illumination device also includes a controller electrically connected with the light-emitting element and the main switch, wherein the battery is configured to supply the power to the controller, such that the controller controls the light-emitting element to power on/off by conducting or not conducting the main switch, wherein the illumination device further includes an auxiliary switch fixed on the handle and electrically connected with the controller, and the controller controls the light-emitting element to power on/off by conducting or not conducting the auxiliary switch.

However, the light-emitting element is fixed on the shaft, and the auxiliary switch is mounted on the handle, so the shaft has to accommodate and electrically connected with a wire, thus having a troublesome connection, high failure rate, and poor modularization.

The present invention has arisen to mitigate and/or obviate the afore-described disadvantages.

SUMMARY

The primary aspect of the present invention is to provide a lamp structure of an umbrella by which the illumination device is connected to the lower end of the notch, and the control pusher is connected to the runner, wherein the control switch of the illumination device is driven by the controlling element of the control pusher to be conducted or not, such that the at least one lighting element is power on or off, so electrically connecting a wire in the shaft is eliminated to obtain quick assembly, low failure rate, modularization, and easy connection.

Another aspect of the present invention is to provide a lamp structure of an umbrella by which when the umbrella is opened, the control pusher is switched to the first position to control the at least one lighting element to power on, thus emitting the lights below the umbrella and making warning effect; when the umbrella is opened, the control pusher is switched to the second position to control the at least one lighting element to power off, thus obtaining using convenience, aesthetics appearance, and gripping comfort.

To obtain the above-mentioned aspects, a lamp structure of an umbrella provided by the present invention contains a body, an illumination device, and a control pusher.

The body includes a shaft, a notch fixed on a top of the shaft, a runner slidably fitted on the shaft and located below the notch, and multiple stretchers rotatably connected with the notch and the runner.

The illumination device is connected with a lower end of the notch, and the illumination device includes at least one lighting element, a circuit board configured to control the at least one lighting element to operate or not, and a battery configured to supply power to the at least one lighting element. The circuit board has a control switch, when the runner is moved upward to push the illumination device, the umbrella is opened.

The control pusher is connected to the runner, and the control pusher includes a controlling element. The control pusher is slid vertically with respect to the shaft and is switched in three-section positions, such that the control pusher is slid to a first position, a second position, and a third position relative to the shaft. When the umbrella is opened and the control pusher is switched to the first position, the controlling element and the control switch move close to each other to drive the control switch to be conducted so that the circuit board controls the at least one lighting element to power on. When the umbrella is opened and the control pusher is switched to the second position, the controlling element and the control switch move away from each other to stop conducting the control switch so that the circuit board controls the at least one lighting element to power off. When the control pusher is slid to a third position, the controlling element and the control switch move away from each other and stop conducting the control switch so that the circuit board controls the at least one lighting element to power off.

DETAILED DESCRIPTION

Figure 1:
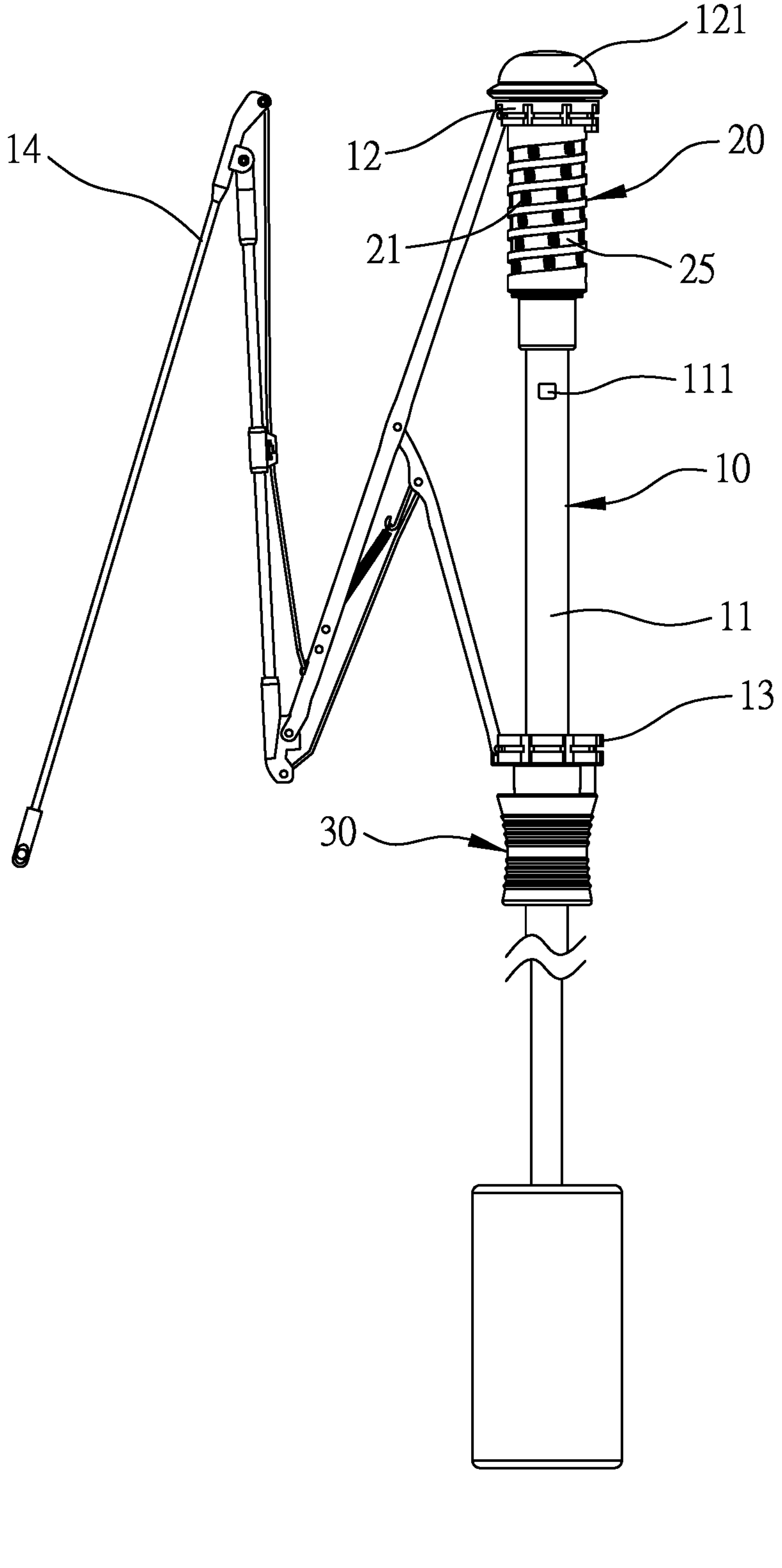
FIG. 1 is a perspective view showing the operation of a lamp structure of an umbrella according to a preferred embodiment of the present invention.
Figure 2:
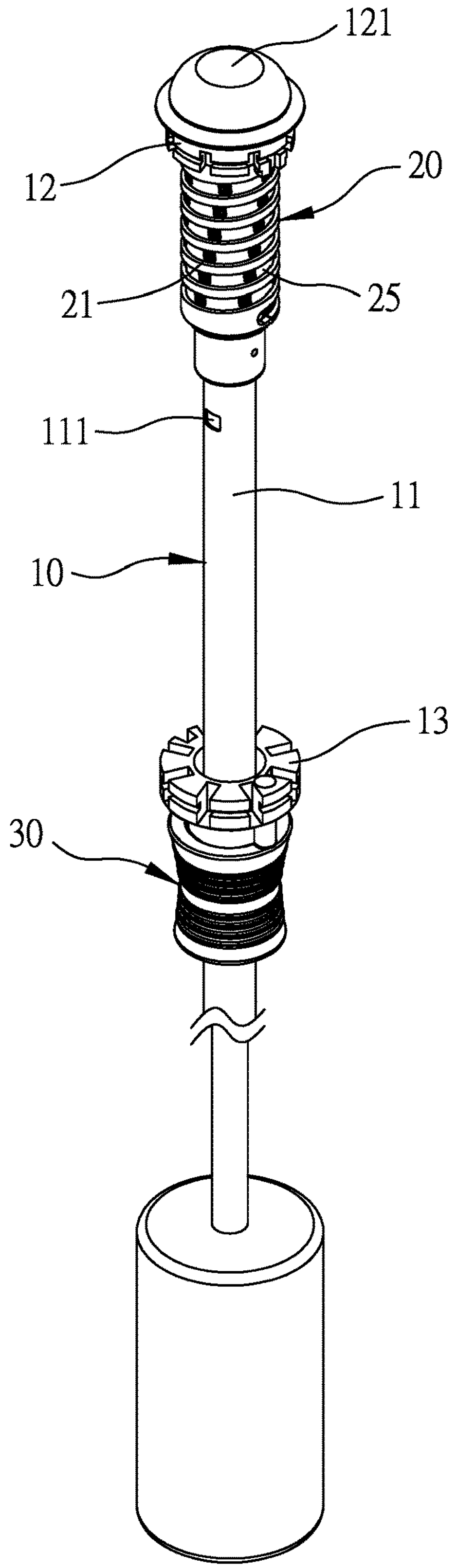
FIG. 2 is a perspective view showing the assembly of the lamp structure of the umbrella according to the preferred embodiment of the present invention.
Figure 3:
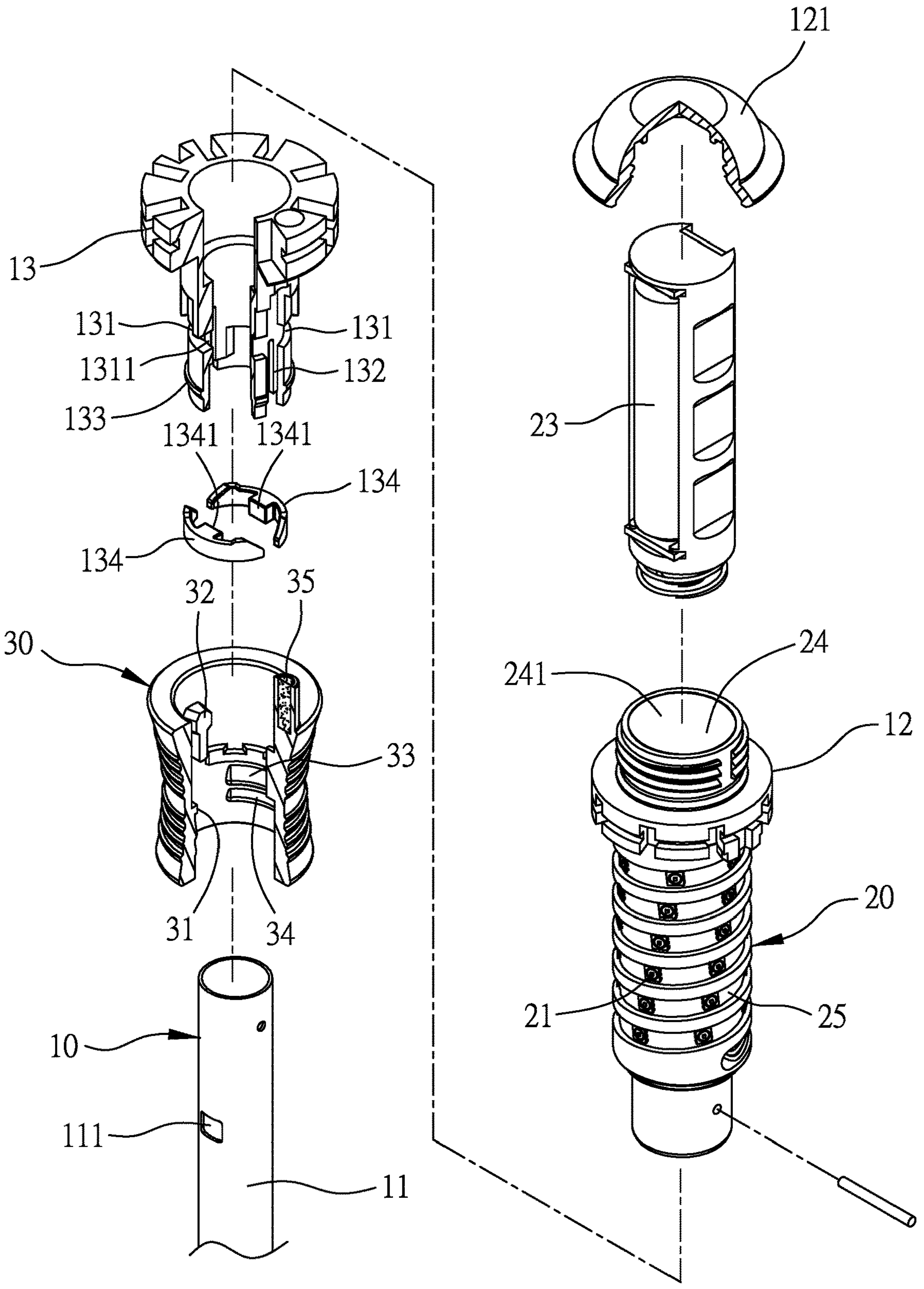
FIG. 3 is a perspective view showing the exploded components of the lamp structure of the umbrella according to the preferred embodiment of the present invention.

With reference to FIGS. 1-11, a lamp structure of an umbrella according to a preferred embodiment of the present invention comprises a body 10, an illumination device 20, and a control pusher 30.

The body 10 includes a shaft 11, a notch 12 fixed on a top of the shaft 11, a runner 13 slidably fitted on the shaft 11 and located below the notch 12, and multiple stretchers 14 rotatably connected with the notch 12 and the runner 13, wherein the shaft 11 includes two connection orifices 111 oppositely defined adjacent to a top of the shaft 11, the notch 12 includes a cap 121 removably screwed thereon, the runner 13 includes two grooves 131 and two longitudinal slots 132 which are defined on a peripheral side of the runner 13, a shoulder 133 extending proximate to a bottom of the peripheral side of the runner 13, a through orifice 1311 formed on a middle portion of a respective one groove 131, and two flexible retainers 134 mounted on the two grooves 131 and being arcuate, wherein a respective one flexible retainer 134 has a locking section 1341 extending inward from a middle thereof, such that the locking section 1341 of the respective one flexible retainer 134 corresponds to the through orifice 1311 of the respective one groove 131, and the locking section 1341 of the respective one flexible retainer 134 is engaged with the a respective one connection orifice 111 of the shaft 11. Also, the multiple stretchers 14 are configured to support a cloth (not shown).

Figure 12:
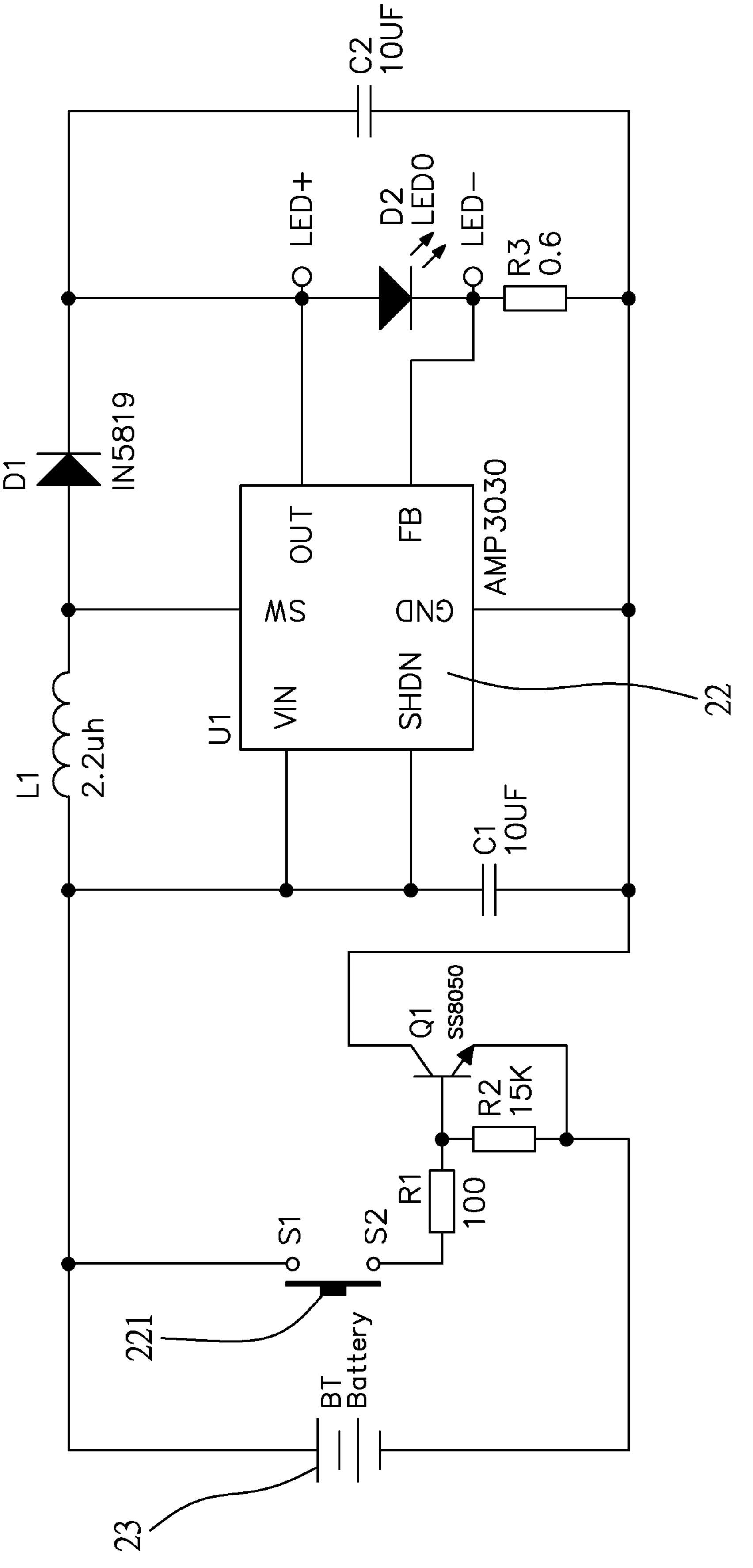
FIG. 12 is a schematic view of a circuit structure of the lamp structure of the umbrella according to the preferred embodiment of the present invention.

The illumination device 20 is connected with a lower end of the notch 12, as shown in FIG. 12, the illumination device 20 includes at least one lighting element 21, a circuit board 22 configured to control the at least one lighting element 21 to operate or not, and a battery 23 configured to supply power to the at least one lighting element 21, wherein the circuit board 22 has a control switch 221. In this embodiment, the control switch 221 is a reed switch. When the runner 13 is moved upward to push the illumination device 20, the umbrella is opened. When the runner 13 is moved downward to remove from the illumination device 20, the umbrella is closed. The illumination device 20 includes an accommodation chamber 24 defined therein and an opening 241 upward passing through the notch 12, such that the battery 23 is received in the accommodation chamber 24 from the opening 241, and the cap 121 is screwed on the upper end of the notch 12 to close the accommodation chamber 24. The at least one lighting element 21 is mounted on a light-emitting strap 25, and the light-emitting strap 25 is spirally surrounded by the illumination device 20.

The control pusher 30 is in a circular tube shape and is connected to the runner 13. The control pusher 30 includes a flange 31 extending from a middle section of an inner wall thereof, two slidable blocks 32 formed above the flange 31, two first positioning protrusions 33 oppositely extending below the flange 31, two second positioning protrusions 34 oppositely extending below the two first positioning protrusions 33, and a controlling element 35 extending upward from a side of the control pusher 30. In this embodiment, the controlling element 35 is a magnet and corresponds to the control switch 221, such that the two slidable blocks 32 are slidably received in the two longitudinal slots 132 of the runner 13 to limit the control pusher 30 to slide vertically with respect to the runner 13, and the flange 31, the two first positioning protrusions 33 and the two second positioning protrusions 34 are engaged by the shoulder 133 of the runner 13 to be switched in three-section positions, for example, the control pusher 30 is slid to a first position 30A, a second position 30B, and a third position 30C relative to the shaft 11.

Figure 4:
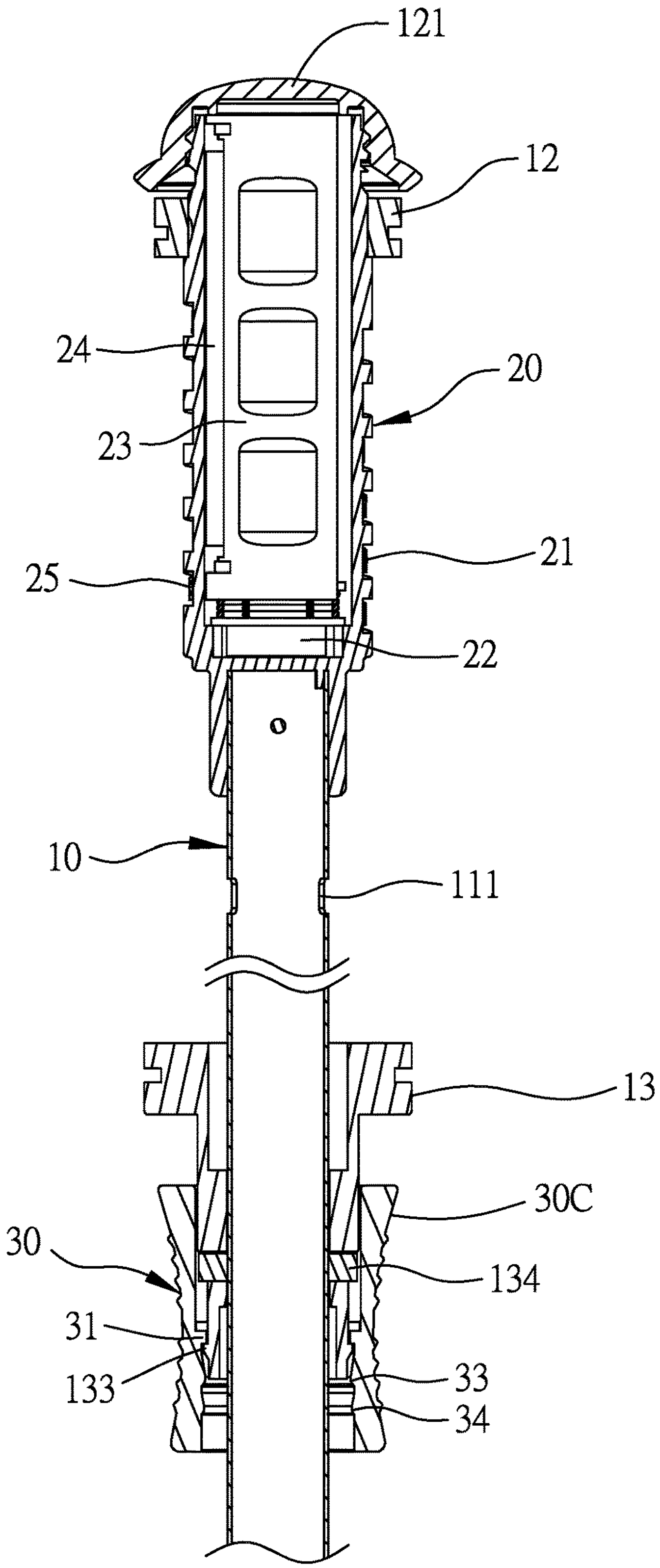
FIG. 4 is a cross-sectional view showing the assembly of the lamp structure of the umbrella according to the preferred embodiment of the present invention.
Figure 5:
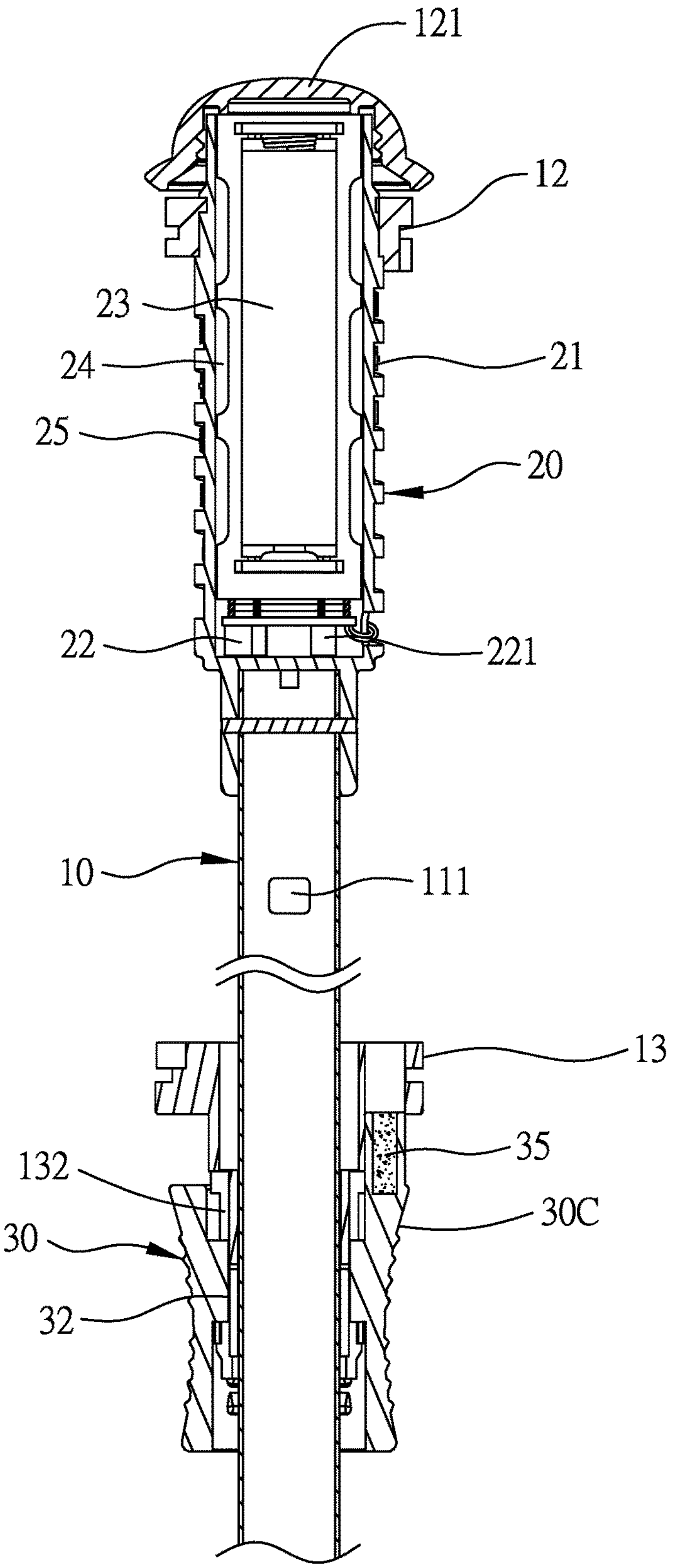
FIG. 5 is another cross-sectional view showing the assembly of the lamp structure of the umbrella according to the preferred embodiment of the present invention.
Figure 6:
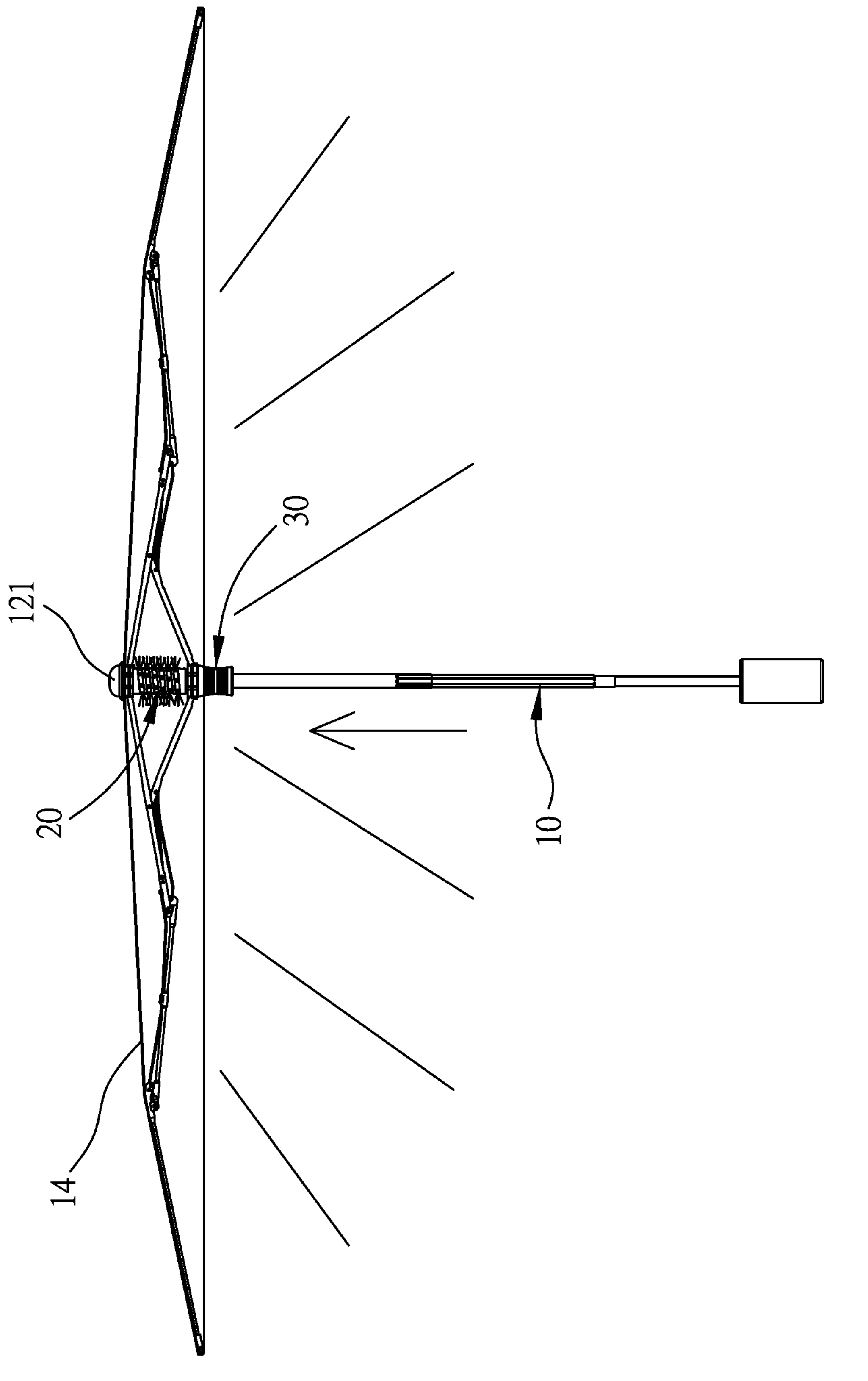
FIG. 6 is a side plan view showing the operation of the lamp structure of the umbrella according to the preferred embodiment of the present invention.
Figure 7:
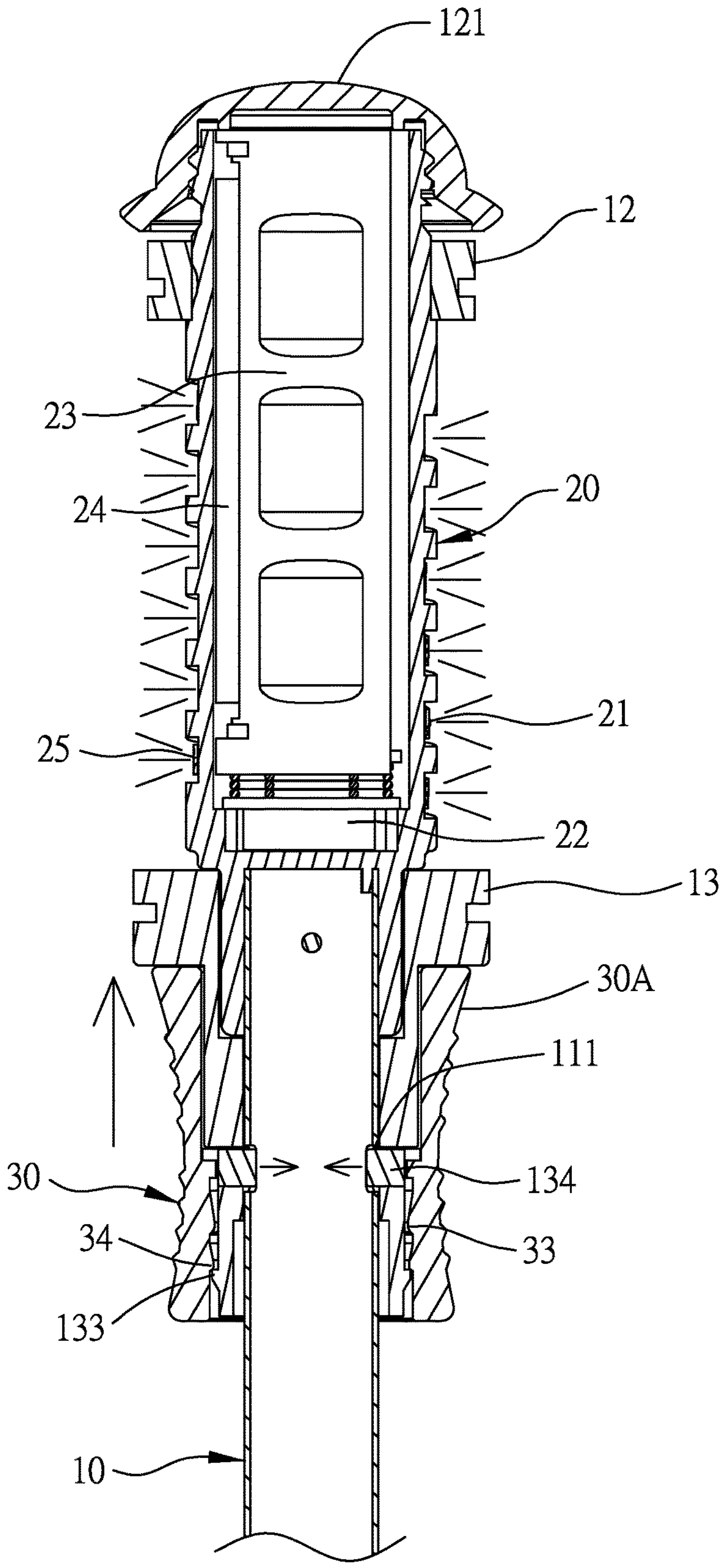
FIG. 7 is a cross-sectional view showing the operation of the lamp structure of the umbrella according to the preferred embodiment of the present invention.
Figure 8:
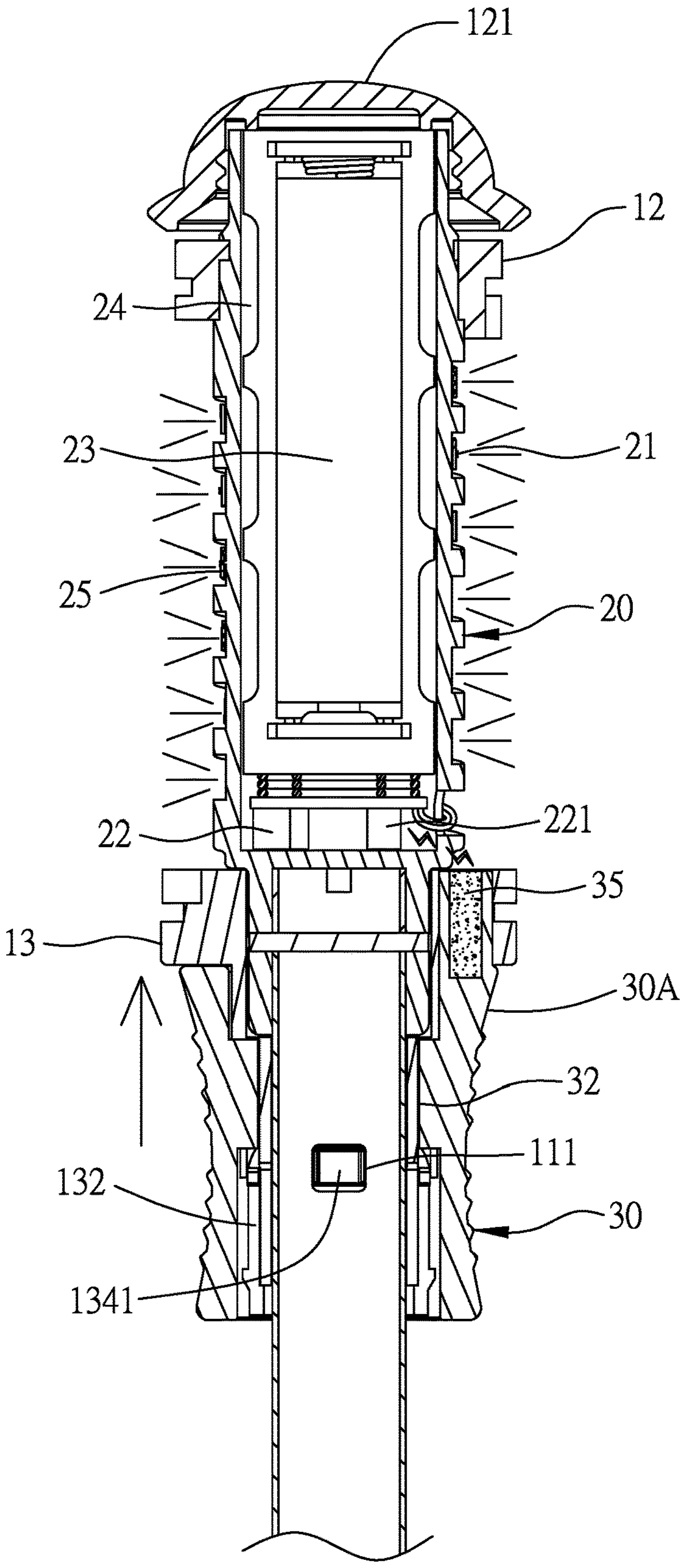
FIG. 8 is another cross-sectional view showing the operation of the lamp structure of the umbrella according to the preferred embodiment of the present invention.
Figure 13:
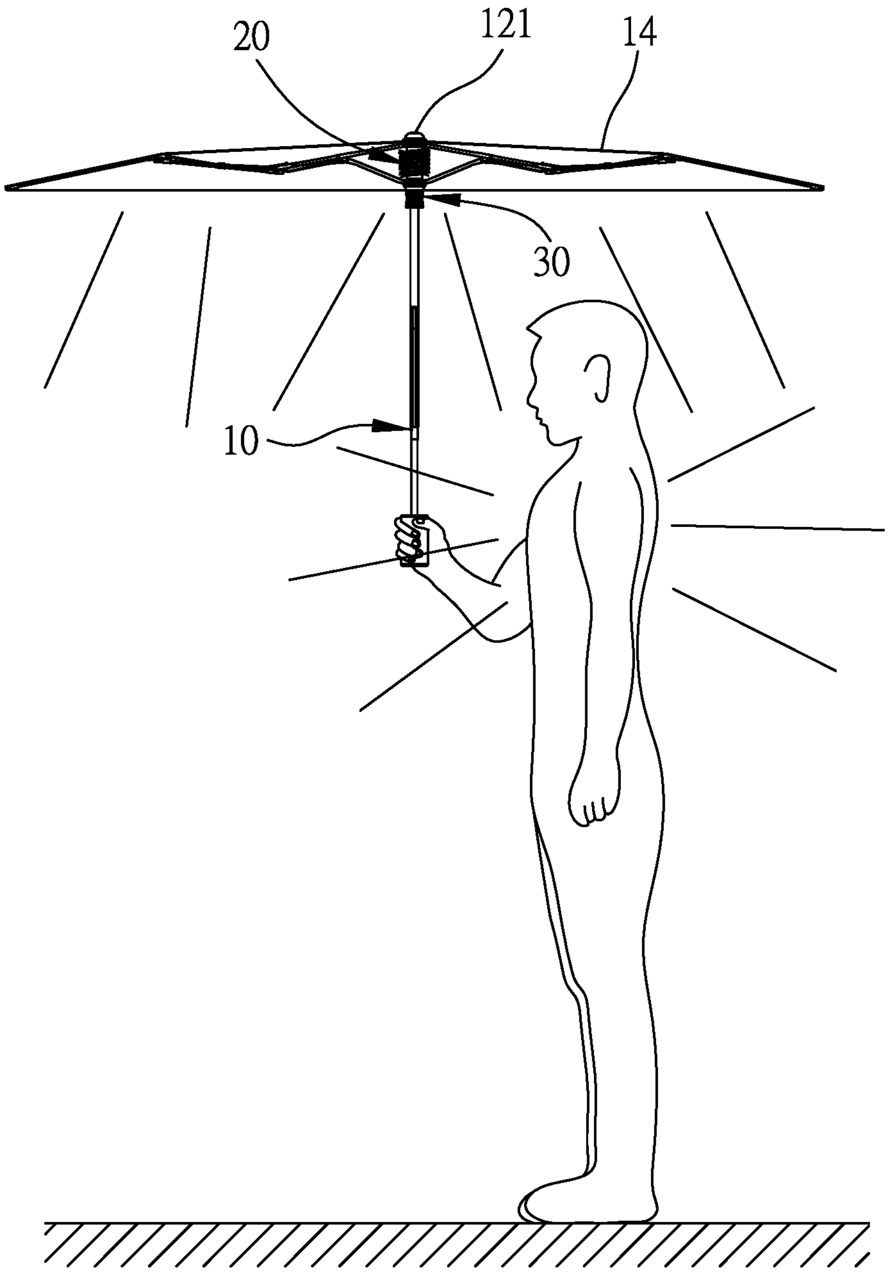
FIG. 13 is a side plan view showing the application of the lamp structure of the umbrella according to the preferred embodiment of the present invention.
Figure 14:
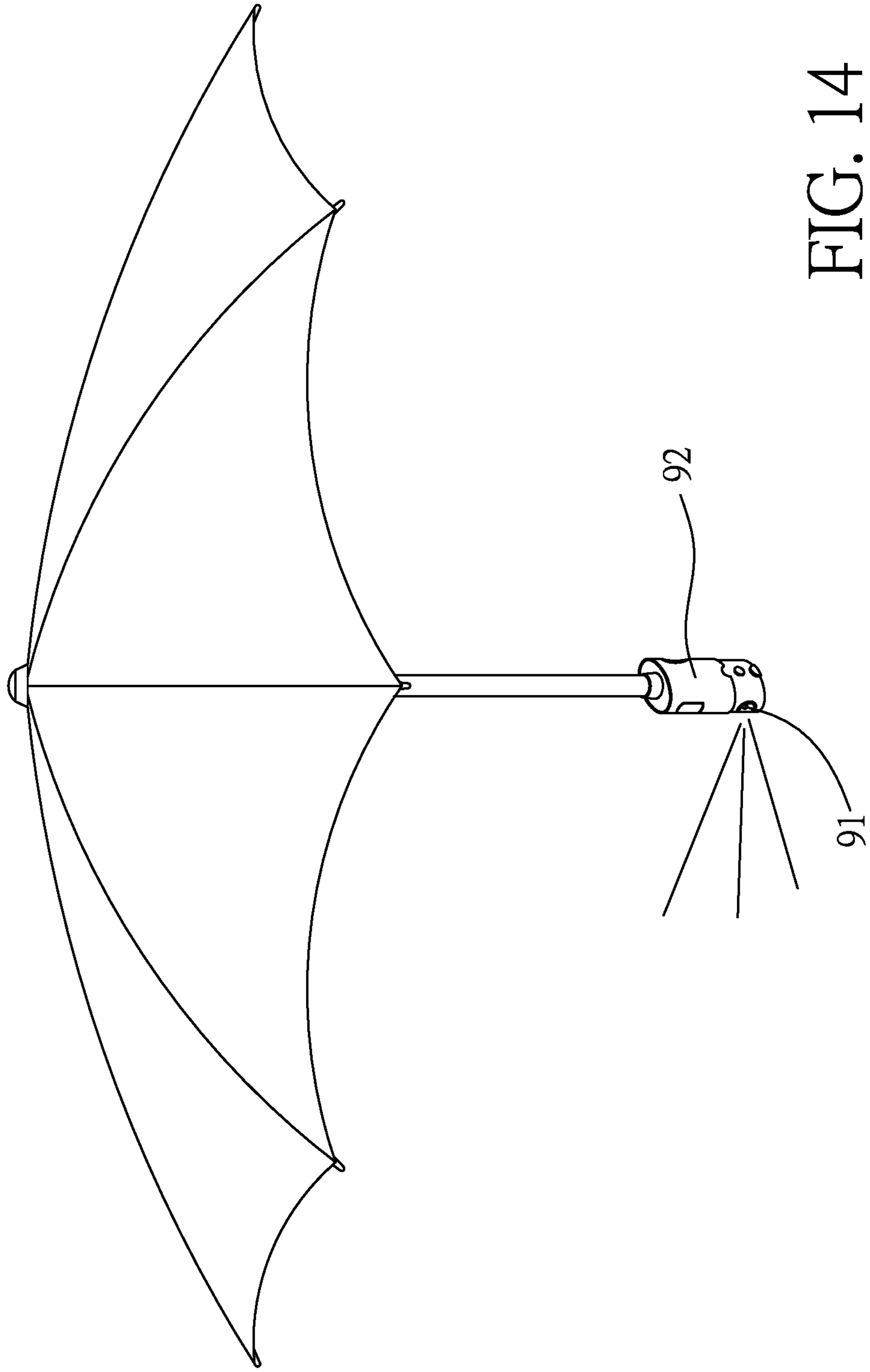
FIG. 14 PRIOR ART
FIG. 14 is a side place view showing the application of a conventional umbrella.

When closing the umbrella, as shown in FIGS. 4 and 5, the control pusher 30 is located at a third position 30C, the flange 31 of the control pusher 30 is engaged by the shoulder 133 of the runner 13, the controlling element 35 and the control switch 221 move away from each other and do not drive the control switch 221 to conduct, the circuit board 22 controls the at least one lighting element 21 to power off, wherein the control pusher 30 and the runner 13 slide vertically along the shaft 11. Referring to FIGS. 6-8, when the umbrella is used in a dark environment, the runner 13 is slid upward to push the illumination device 20 to be in an opening state, so the control pusher 30 is pushed upward to be switched to the first position 30A, the two first positioning protrusions 33 of the control pusher 30 are pushed by the shoulder 133 of the runner 13, the controlling element 35 and the control switch 221 move close to each other to drive the control switch 221 to be conducted so that the circuit board 22 controls the at least one lighting element 21 to power on, and the at least one lighting element 21 illuminates light from top to bottom (as illustrated in FIG. 13), thus increasing illumination range and effect and emitting a user to make a warning effect.

Figure 9:
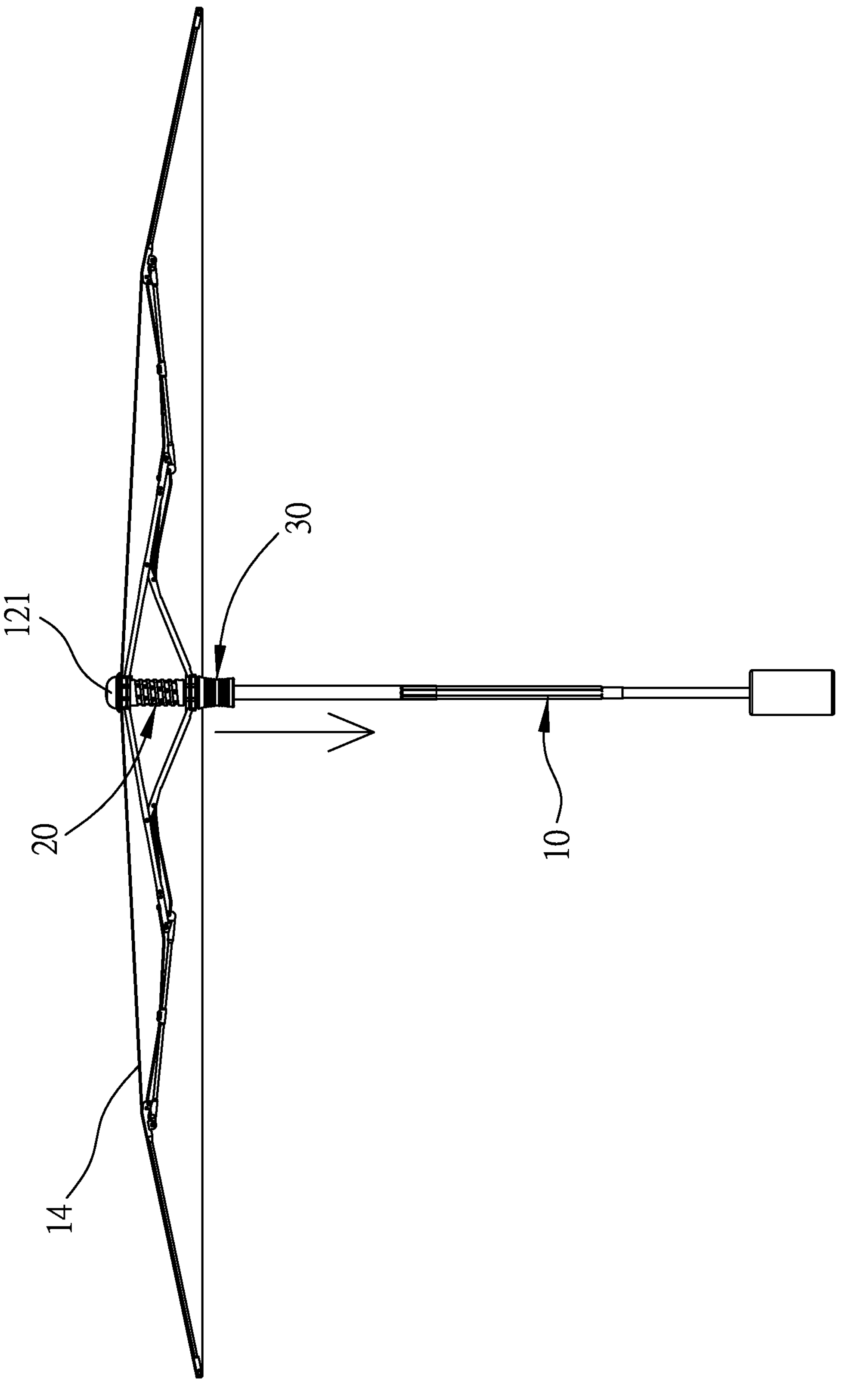
FIG. 9 is a side plan view showing the operation of the lamp structure of the umbrella according to the preferred embodiment of the present invention.
Figure 10:
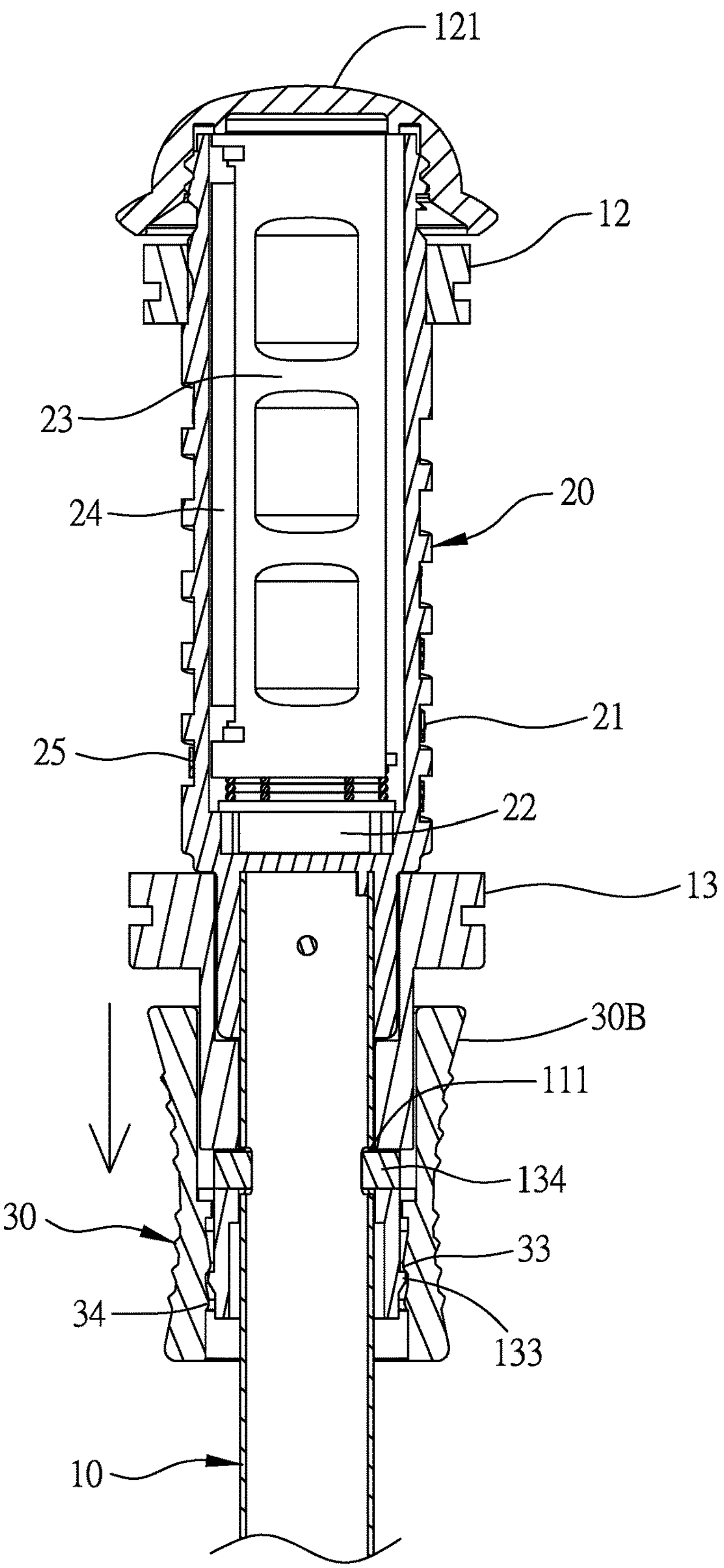
FIG. 10 is a cross-sectional view showing the operation of the lamp structure of the umbrella according to the preferred embodiment of the present invention.
Figure 11:
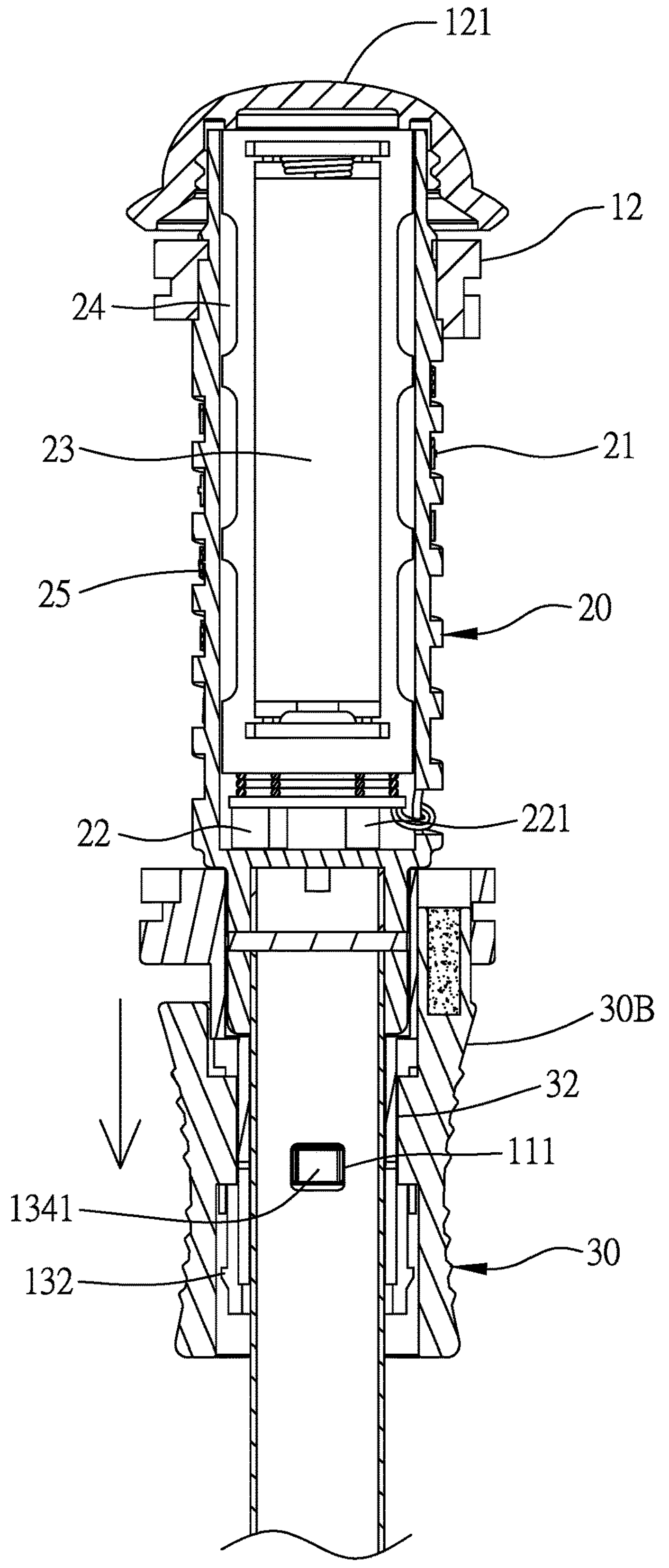
FIG. 11 is another cross-sectional view showing the operation of the lamp structure of the umbrella according to the preferred embodiment of the present invention.

With reference to FIGS. 9-11, when the umbrella is used in a bright environment, the runner 13 is slid upward to push the illumination device 20 to open the umbrella so that the control pusher 30 is pushed downward to be switched to the second position 30B, wherein the two second positioning protrusions 34 of the control pusher 30 are engaged by the shoulder 133 of the runner 13, the controlling element 35 and the control switch 221 move away from each other to stop conducting the control switch 221 so that the circuit board 22 controls the at least one lighting element 21 to power off, thus avoiding compunction of the power.

Thereby, the lamp structure of the umbrella has advantages as follows:

1) The illumination device 20 is connected to the lower end of the notch 12, and the control pusher 30 is connected to the runner 13, wherein the control switch 221 of the illumination device 20 is driven by the controlling element 35 of the control pusher 30 to be conducted or not, such that the at least one lighting element 21 is power on or off, so electrically connecting a wire in the shaft 11 is eliminated to obtain quick assembly, low failure rate, modularization, and easy connection.
2) When the umbrella is opened, the control pusher 30 is switched to the first position 30A to control the at least one lighting element 21 to power on, thus emitting the lights below the umbrella and making a warning effect. Also, when the umbrella is opened, the control pusher 30 is switched to the second position 30B to control the at least one lighting element 21 to power off, thus obtaining using convenience, aesthetic appearance, and gripping comfort.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A lamp structure of an umbrella comprising:

a body including a shaft, a notch fixed on a top of the shaft, a runner slidably fitted on the shaft and located below the notch, and multiple stretchers rotatably connected with the notch and the runner;

an illumination device connected with a lower end of the notch, the illumination device including at least one lighting element, a circuit board configured to control the at least one lighting element to operate or not, and a battery configured to supply power to the at least one lighting element, wherein the circuit board has a control switch, when the runner is moved upward to push the illumination device, the umbrella is opened; and a control pusher connected on the runner, and the control pusher including a controlling element, wherein the control pusher is slid vertically with respect to the shaft and is switched in three-section positions, such that the control pusher is slid to a first position, a second position, and a third position relative to the shaft; wherein when the umbrella is opened and the control pusher is switched to the first position, the controlling element and the control switch move close to each other to drive the control switch to be conducted so that the circuit board controls the at least one lighting element to power on; when the umbrella is opened and the control pusher is switched to the second position, the controlling element and the control switch move away from each other to stop conducting the control switch so that the circuit board controls the at least one lighting element to power off; when the control pusher is slid to a third position, the controlling element and the control switch move away from each other and stop conducting the control switch so that the circuit board controls the at least one lighting element to power off.

2. The lamp structure as claimed in claim 1, wherein the illumination device includes an accommodation chamber defined therein and an opening upward passing through the notch, such that the battery is received in the accommodation chamber from the opening, and a cap is removably screwed on the upper end of the notch to close the accommodation chamber.

3. The lamp structure as claimed in claim 1, wherein the control switch is a reed switch, and the controlling element is a magnet.

4. The lamp structure as claimed in claim 1, wherein the shaft includes two connection orifices oppositely defined adjacent to a top of the shaft, the runner includes two grooves defined on a peripheral side thereof, a through orifice formed on a middle portion of a respective one groove, and two flexible retainers mounted on the two grooves and being arcuate, wherein a respective one flexible retainer has a locking section extending inward from a middle thereof, such that the locking section of the respective one flexible retainer corresponds to the through orifice of the respective one groove, and the locking section of the respective one flexible retainer is engaged with the respective one connection orifice of the shaft.

5. The lamp structure as claimed in claim 1, wherein the runner includes a shoulder extending proximate to a bottom of the peripheral side thereof, the control pusher includes a flange extending from a middle section of an inner wall thereof, two first positioning protrusions oppositely extending below the flange, two second positioning protrusions oppositely extending below the two first positioning protrusions, such that the and the flange, the two first positioning protrusions and the two second positioning protrusions are engaged by the shoulder of the runner to be switched in three-section positions; wherein when the control pusher is switched to the first position, the two first positioning protrusions are engaged by the shoulder; when the control pusher is switched to the third position, the two second positioning protrusions of the control pusher are engaged by the shoulder, and the flange of the control pusher is limited by the shoulder.

6. The lamp structure as claimed in claim 1, wherein the runner includes two longitudinal slots defined on the peripheral side thereof, and the control pusher includes two slidable blocks formed on an inner wall thereof, such that the two slidable blocks are slidably received in the two longitudinal slots of the runner to limit the control pusher to slide vertically with respect to the runner.

7. The lamp structure as claimed in claim 1, wherein the at least one lighting element is mounted on a light-emitting strap, and the light-emitting strap is spirally surrounded the illumination device.

* * * * *